UNITED STATES PATENT OFFICE 2,687,416

HYDANTOIN COMPOUNDS

Walther Persch, Frankfurt (Main) Hochst, and Adolf Schmidt, Frankfurt (Main) Fechenheim, Germany, assignors to Cassella Farbwerke Mainkur Aktiengesellschaft, Frankfurt (Main) Fechenheim, Germany, a German company No Drawing. Application February 19, 1951, Serial No. 211,794

Claims priority, application Germany March 6, 1950

3 Claims. (Cl. 260—309.5)

This invention relates to new hydantoin compounds.

It is known to use hydantoins, e. g., diphenylhydantoin, against genuine epilepsis and against the pathological symptoms of brain trauma owing to their action of alleviating or removing the seizures. It is further known that epileptics resistant to barbituric acid can be treated with success by hydantoins.

It has now been found that the hydantoins of the general formula:

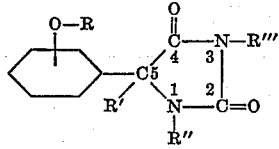

(wherein R means a radical of the group consisting of hydrogen, aryl, alkyl which latter may contain a basic group; R' means a radical of the group consisting of hydrogen, alkyl, aryl; R'' and R''' mean each a radical of the group consisting of hydrogen, aralkyl and alkyl), which hydantoins are new compounds, show, besides the antiepileptic action customary for hydantoins, a peculiar and predominant hypnotic action.

These new compounds may be prepared as follows: compounds of the formula:

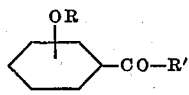

(wherein R and R' have the above signification) may be treated with ammonium carbonate and alkalicyanide under heat with or without an elevated pressure of carbon dioxide. Especially the hydantoins substituted in the 1-position may be obtained by reacting on the aforesaid starting material with primary amines, converting the imines thus obtained by means of hydrocyanic acid (or alkali cyanide and an acid) into aminonitriles, treating the latter with alkali cyanate and saponifying with acids. They may further be obtained by acting with alcohol, caustic soda solution and urea on substituted benziles. Into the hydantoins thus prepared further substituents may be introduced, e. g. alkyl groups, especially when R and R' of the primarily prepared hydantoins are hydrogen, or bromine atoms when the radicals R, R', R'' or R''' mean an unsaturated group, or alkylamino groups when the radicals R, R', R'' or R''' contain substituents convertible into such groups.

The following examples illustrate the invention, but they are not intended to limit it thereto.

EXAMPLE 1

*5(o-hydroxyphenyl)-5-methyl-hydantoin*

204 grs. of o-hydroxyacetophenone, 120 grs. of potassium cyanide, 240 grs. of ammonium bicarbonate, 500 ccm. of ethanol and 600 ccm. of water are stirred for 12 hours under a $CO_2$-pressure of 15–17 atm. When worked up, the crystals obtained represent—after a recrystallization from ethanol—pure 5-(o-hydroxyphenyl)-5-methyl-hydantoin of a melting-point of 229–230.5° C.

EXAMPLE 2

*5(p-allyloxyphenyl)-5-methyl-hydantoin*

88 grs. of p-allyloxy-acetophenone (obtained from p-hydroxy-acetophenone and allylbromide), 40 grs. of potassium cyanide, 75 grs. of ammoniumbicarbonate, 200 ccm. of ethanol and 250 ccm. of water are stirred for 15 hours in an autoclave at 16–18 atm. $CO_2$-pressure at 70–75° C. The crystals obtained show—after a recrystallization from methanol—a melting-point of 171° C.

EXAMPLE 3

*5-o(β-diethylamino-ethoxy)-phenyl-5-propyl-hydantoin*

61 grs. of o(β-diethylamino-ethoxy)-butyrophenone (at room-temperature an oil of a boiling point of 175–176° C. at 2 mm., prepared from o-hydroxy-butyrophenone and diethylamino-chlorethane), 30 grs. of potassium cyanide, 60 grs. of ammonium carbonate, 250 ccm. of water and 200 ccm. of ethanol are stirred in an autoclave for 10 hours at 70–80° C. and 14–17 atm. The crystals obtained recrystallize from methanol as pure white crystals of a melting point of 156° C.

EXAMPLE 4

*5-(o-hydroxyphenyl)-1-N(n)butyl-hydantoin*

121 grs. of freshly distilled salicylaldehyde are converted by 75 grs. of n-butylamine into the imine. This is dropped at a temperature of about 5° C. to a mixture of 400 grs. of 75% acetic acid and 38 grs. of potassium cyanide, which mixture is stirred in a cooling bath at about 0° C. Another 38 grs. of potassium cyanide are then added gradually. When the temperature is again at 0° C., 87 grs. of potassium cyanate are added within half an hour, the temperature being kept below 5° C. After stirring at room temperature for 1 hour, the temperature is slowly raised to 70° C. and stirring is continued for 15 minutes at this temperature. At 50° C. 300 ccm. of concentrated hydrochloric acid are added by dropping, initial cooling being applied. Stirring is then continued for 1 more hour at 90° C. Thereupon about 3 litres of ice-water are added and the whole is kept in ice during one night. The separated crystals are recrystallized twice from methanol, some charcoal being added. Thus almost white crystals are obtained of a melting-point of 191° C.

EXAMPLE 5

*5-p(β-γ-dibromopropoxyphenyl)-5-methyl-hydantoin*

At room temperature 8 grs. of bromine in 100 ccm. of dry chloroform are dropped into 12.3 grs. of 5-p-allyloxy-phenyl-5-methyl-hydantoin (prepared as outlined in Example 2), dissolved in about 1700 ccm. of dry chloroform. After stirring during several hours, the chloroform is removed under vacuum. The residue is recrystalized with some charcoal from methanol, delivering white crystals with a melting-point of 180–183° C.

EXAMPLE 6

*5-p-phenoxyphenyl-5-methyl-hydantoin*

88 grs. of p-phenoxyacetophenone (boiling-point: 174–178° C. at 1 mm.), 35 grs. of potassium cyanide, 60 grs. of ammoniumbicarbonate are stirred with 250 ccm. of water and 250 ccm. of alcohol in an autoclave under 20 atm. $CO_2$-pressure at 70–75° C. for 15 hours. The raw product is sucked off and after recrystallizing it twice from alcohol, pure 5-p-phenoxy-phenyl-5-methyl-hydantoin is obtained with a melting-point of 182° C.

EXAMPLE 7

*3-methyl-5-methyl-5-p-allyloxyphenyl-hydantoin*

123 grs. of 5-p-allyloxyphenyl-5-methyl-hydantoin are dissolved in 525 ccm. of a 1 n solution of caustic soda and 300 ccm. of water. Under cooling 165 grs. of dimethylsulfate are allowed to run in. The product, which precipitates after 2 minutes, is sucked off, washed and dried. After recrystallization from methanol it shows a melting point of 137–138° C.

The following table shows some additional members of the group of hydantoin compounds prepared according to the present invention and characterized by a variation of the radicals R, R', R'' and R''' of the above formula.

| No. | O–R (phenyl) | R' | R'' | R''' | Fp., degrees |
|---|---|---|---|---|---|
| 1 | HO–⟨phenyl⟩– (para) | $CH_3$ | H | H | 244–246. |
| 2 | HO–⟨phenyl⟩– (para) | $C_2H_5$ | H | H | 258–261. |
| 3 | HO–⟨phenyl⟩– (para) | $C_3H_7(n)$ | H | H | 245–246. |
| 4 | OH (ortho) | $C_2H_5$ | H | H | 213–214. |
| 5 | OH (ortho) | $C_3H_7(n)$ | H | H | 218.5. |
| 6 | $C_2H_5O$–⟨phenyl⟩– (para) | $C_2H_5$ | H | H | 151. |
| 7 | $C_2H_5O$–⟨phenyl⟩– (para) | $C_3H_7(n)$ | H | H | 179. |
| 8 | $OC_2H_5$ (ortho) | $CH_3$ | H | H | 181–182.5. |
| 9 | $OC_2H_5$ (ortho) | $C_2H_5$ | H | H | 164–166. |
| 10 | $OC_2H_5$ (ortho) | $C_3H_7(n)$ | H | H | 158–159. |

| No. | ![O-R on cyclohexane] | R' | R'' | R''' | Fp., degrees |
|---|---|---|---|---|---|
| 11 | O.CH₂.CH.CH₂ / Br Br (phenyl) | CH₃ | H | H | 199–201. |
| 12 | CH₂.CH.CH₂.O— (phenyl) / Br Br | C₂H₅ | H | H | 180–183. |
| 13 | CH₂.CH.CH₂.O— (phenyl) / Br Br | C₃H₇(n) | H | H | 159–161. |
| 14 | (C₂H₅)₂.N.CH₂.CH₂.O— (phenyl) | CH₃ | H | H | 167–169.5. |
| 15 | (C₂H₅)₂.N.CH₂.CH₂.O— (phenyl) | C₂H₅ | H | H | 162.5–163. |
| 16 | (C₂H₅)₂.N.CH₂.CH₂.O— (phenyl) | C₃H₇(n) | H | H | 153–154. |
| 17 | (C₂H₅)₂.N.CH₂.CH₂.O (phenyl) | CH₃ | H | H | 181.5–182.5. |
| 18 | (C₂H₅)₂.N.CH₂.CH₂.O (phenyl) | C₂H₅ | H | H | 195. |
| 19 | (phenyl)-OH | H | CH₃ | H | 273. |
| 20 | (phenyl)-OH | H | C₂H₅ | H | 203. |
| 21 | (phenyl)-OH | H | C₃H₇(n) | H | 216–217. |
| 22 | (phenyl)-OH | H | C₂H₅ | H | 184–185. |
| 23 | HO—(phenyl) | C₆H₅ | H | H | 307. |
| 24 | C₂H₅O—(phenyl) | C₆H₅ | H | H | 192–193. |
| 25 | C₂H₅O—(phenyl) | CH₃ | H | —CH₂.C₆H₅ | 114–115. |
| 26 | OC₂H₅ (phenyl) | CH₃ | H | CH₃ | 193–194. |
| 27 | (phenyl)-OH | H | —CH₂.CHBr.CH₂.Br | H | 172–180. |
| 28 | (phenyl)-OH | H | —CH₂.CH₂.C₆H₅ | H | 234–235. |

We claim:
1. Hydantoin compounds corresponding to the general formula

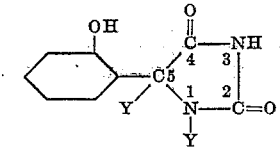

wherein one Y stands for hydrogen and the other Y for methyl, which compounds represent when recrystallized from an alcohol white or feebly yellow crystals of a definite melting point and are distinguished by an antiepileptic and simultaneously a hypnotic action.

2. The hydantoin compound of the formula:

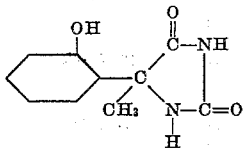

which compound represents when recrystallized from an alcohol white or feebly yellow crystals melting at 299–230.5° C. and is distinguished by an antiepileptic and simultaneously a hypnotic action.

3. The hydantoin compound of the formula:

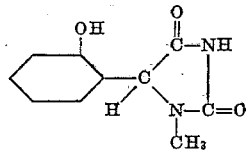

which compound represents when recrystallized from an alcohol white or feebly yellow crystals melting at 273° C. and is distinguished by an antiepileptic and simultaneously a hypnotic action.

References Cited in the file of this patent

Chemical Abstracts, vol. 42, p. 3372 citing Gorvin, Nature, 161, page 208 (1948).

Chemical Abstracts, vol. 41, p. 6885 citing Melton et al.—Jr. Am. Chem. Soc.—69—p.2018–18 (1947).

Henze, Jr. Amer. Chem. Soc., vol. 64, p. 522–3 (1942.)

Chemical Abstracts, vol. 30, p. 4474 citing Berichte—pp. 566—572 (1936).